(12) United States Patent
Wang et al.

(10) Patent No.: US 11,600,233 B2
(45) Date of Patent: Mar. 7, 2023

(54) DISPLAY PANEL HAVING A PLURALITY OF MULTIPLEXING CIRCUIT FOR OUTPUTTING MULTIPLE TYPES OF DATA SIGNAL

(71) Applicant: BOE Technology Group Co., Ltd., Beijing (CN)

(72) Inventors: Hongrun Wang, Beijing (CN); Fuqiang Li, Beijing (CN); Changfeng Li, Beijing (CN); Hui Zhang, Beijing (CN); Xue Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/475,358

(22) Filed: Sep. 15, 2021

(65) Prior Publication Data
US 2022/0157259 A1 May 19, 2022

(30) Foreign Application Priority Data
Nov. 15, 2020 (CN) .......................... 202011274248.9

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2310/027* (2013.01); *G09G 2310/0297* (2013.01); *G09G 2310/061* (2013.01)

(58) Field of Classification Search
CPC .................................................. G09G 3/3275
USPC ........................................................ 345/204
See application file for complete search history.

(56) References Cited

U.S. PATENT DOCUMENTS

| | | | |
|---|---|---|---|
| 2006/0071884 A1* | 4/2006 | Kim | G09G 3/3233 345/76 |
| 2015/0187265 A1 | 7/2015 | Zhang et al. | |
| 2020/0394953 A1* | 12/2020 | Kim | H05B 45/325 |

FOREIGN PATENT DOCUMENTS

| | | |
|---|---|---|
| CN | 103927978 A | 7/2014 |
| CN | 110599941 A | 12/2019 |
| CN | 111243522 A | 6/2020 |
| CN | 111613183 A | 9/2020 |

OTHER PUBLICATIONS

Office Action dated Dec. 15, 2022 for Chinese Patent Application No. 202011274248.9 and English Translation.

* cited by examiner

*Primary Examiner* — Long D Pham
(74) *Attorney, Agent, or Firm* — Ling Wu; Stephen Yang; Ling and Yang Intellectual Property

(57) ABSTRACT

A display panel includes a display region and a bezel region. The bezel region includes multiple multiplexing circuits, and at least one multiplexing circuit includes m multiplexing units, 2n multiplexing control signal lines, m first multiplexing data signal lines, at least one second multiplexing data signal line and n data signal output lines. A multiplexing unit is configured to receive a gating signal of a first multiplexing data signal line based on control signals of the 2n multiplexing control signal lines in a first stage, and in a second stage, based on the gating signal, to write a first type data signal of the first multiplexing data signal line or a second type data signal of a second multiplexing data signal line into a data signal line through a data signal output line when a scan signal is input to a scan signal line.

17 Claims, 6 Drawing Sheets

DISPLAY PANEL HAVING A PLURALITY OF MULTIPLEXING CIRCUIT FOR OUTPUTTING MULTIPLE TYPES OF DATA SIGNAL

CROSS-REFERENCE TO RELATED APPLICATION

The present application claims the priority of Chinese Patent Application No. 202011274248.9 filed to the CNIPA on Nov. 15, 2020, the content of which is hereby incorporated by reference.

TECHNICAL FIELD

The present disclosure relates to, but is not limited to, the field of display technology, and particularly relates to a display panel, a driving method thereof, and a display apparatus.

BACKGROUND

The Organic Light Emitting Diode (OLED) is an active light emitting display device, which has advantages of self-illumination, ultra-thinness, fast response speed, wide viewing angle and low power consumption. With a continuous development of the OLED display technology, high Pixels Per Inch (PPI) display is gaining increasing attention.

SUMMARY

The following is a summary about the subject matter described in the present disclosure in detail. This summary is not intended to limit the protection scope of the claims.

In one aspect, an embodiment of the present disclosure provides display panel, including a display region and a bezel region. The display region includes a plurality of scan signal lines, a plurality of data signal lines intersecting the scan signal lines, and a plurality of sub-pixels defined by the intersection of the scan signal lines and the data signal lines, wherein when a scan signal is input to a scan signal line, a data signal line writes a data signal into a corresponding sub-pixel. The bezel region includes a plurality of multiplexing circuits, and at least one multiplexing circuit includes m multiplexing units, 2n multiplexing control signal lines, m first multiplexing data signal lines, at least one second multiplexing data signal line and n data signal output lines; wherein each data signal output line is connected to a data signal line, $2 \leq m \leq n$, and m and n are positive integers; each multiplexing unit is connected to a first multiplexing data signal line, and the multiplexing unit is configured to receive a gating signal of the first multiplexing data signal line based on control signals of the 2n multiplexing control signal lines in a first stage, and in a second stage, based on the gating signal, to write a first type data signal of the first multiplexing data signal line or a second type data signal of a second multiplexing data signal line into a data signal line through a data signal output line when a scan signal is input to a scan signal line.

In another aspect, an embodiment of the present disclosure provides a driving method applied to a display panel as described above, the driving method including: in a first stage, receiving a gating signal input by a first multiplexing data signal line based on control of a multiplexing control signal line; and in a second stage, based on the gating signal, writing a first type data signal of the first multiplexing data signal line or a second type data signal of a second multiplexing data signal line into a data signal line through a data signal output line when a scan signal is input to a scan signal line.

In yet another aspect, an embodiment of the present disclosure provides a display apparatus including a display panel as described above.

Of course, the implementation of any product or method of the present disclosure does not necessarily need to realize all the above-mentioned advantages at the same time. Other features and advantages of the present disclosure will be set forth in the following embodiments of the description, and in part will become apparent from the embodiments of the description, or be learned by practice of the present disclosure. Purposes and other advantages of the technical solutions of the present disclosure may be achieved and acquired by structures specified in the detailed description, claims and drawings.

Other aspects may be comprehended upon reading and understanding of the drawings and the detailed description.

BRIEF DESCRIPTION OF DRAWINGS

The drawings facilitate further understanding of the technical solution of the present disclosure, form a part of the specification, and together with the embodiments of the present disclosure, are used to explain the technical solution of the present disclosure but not intended to form limits to the technical solution of the present disclosure. Shapes and sizes of each component in the drawings do not reflect true proportions and are only used to schematically illustrate contents of the present disclosure.

DETAILED DESCRIPTION

Figure 1:
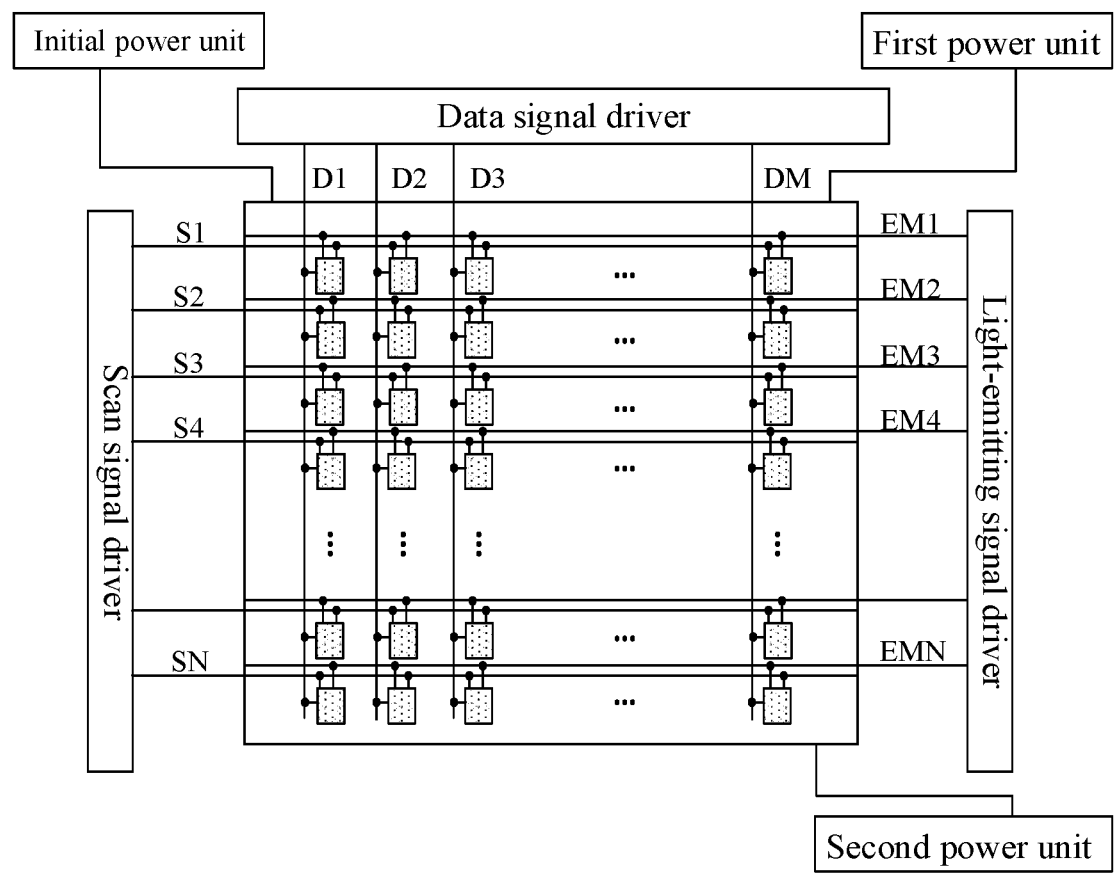
FIG. 1 is a schematic diagram of a circuit structure of an OLED display apparatus.

The present disclosure describes multiple embodiments, but the description is exemplary rather than restrictive. It will be apparent to those of ordinary skill in the art that there may be more embodiments and implementation solutions within the scope of the embodiments described in the present disclosure. Although a number of possible combinations of features are shown in the drawings and discussed in the embodiments, many other combinations of the disclosed features are also possible. Unless expressly limited otherwise, any feature or element of any embodiment may be used in combination with, or in place of, any other feature or element of any other embodiment.

The present disclosure includes and contemplates combinations of features and elements known to those of ordinary skill in the art. The embodiments, features, and elements disclosed in the present disclosure may also be combined with any conventional features or elements to form a unique scheme defined by the claims. Any feature or element of any embodiment may also be combined with a features or an element from another scheme to form another unique scheme defined by the claims. Therefore, it should be understood that any feature shown or discussed in the disclosure may be implemented independently or in any appropriate combination. Therefore, the embodiments are not limited except as by the appended claims and their equivalents. In addition, one or more modifications and alterations may be made within the protection scope of the appended claims.

In addition, when a representative embodiment is described, a method or a process may already be presented as a specific step sequence in the specification. However, to the extent that the method or process does not depend on a particular order of steps described herein, the method or process should not be limited to the particular order of steps described. As will be appreciated by those of ordinary skill in the art, other orders of steps are possible. Therefore, the particular order of steps set forth in the specification should not be construed as limitations on the claims. Moreover, execution of the steps of the method of the process in the claims for the method or the process should not be limited to the written sequence, and it may be easily understood by those skilled in the art that these sequences may be changed and still fall within the spirit and scope of the embodiments of the disclosure.

In the drawings, a size of a constituent element, or a thickness of a layer or an area, is sometimes exaggerated for clarity. Therefore, an implementation of the present disclosure is not necessarily limited to the size shown, and a shape and size of each component in the drawings do not reflect true proportions. In addition, the drawings schematically illustrate ideal examples, and any embodiment of the present disclosure is not limited to the shapes, numerical values or the like illustrated in the drawings.

Unless otherwise defined, technical terms or scientific terms used in the disclosure have the same meanings as commonly understood by those of ordinary skill in the art to which the disclosure belongs. "First", "second", and similar terms used in the disclosure do not represent any sequence, number, or significance but are only used to distinguish different components. In the present disclosure, "multiple" may mean two or more than two. The word "comprise" or "include", etc. means that an element or article that precedes the word is inclusive of the element or article listed after the word and equivalents thereof, but does not exclude other elements or articles. Similar terms such as "couple", "connect" or "link" are not limited to physical or mechanical connections, but may include electrical connections, regardless of whether direct or indirect. "Electrical connection" includes a case where constituent elements are connected together through an element having a certain electrical function. The "element having a certain electrical function" is not particularly limited as long as it may implement reception of an electrical signal between the connected constituent components. Examples of "the element having a certain electrical function" include not only electrodes and wirings, but also switch elements such as transistors, resistors, inductors, capacitors, and other elements with one or more functions.

In the present disclosure, for the sake of convenience, wordings such as "central", "upper", "lower", "front", "rear", "vertical", "horizontal", "top", "bottom", "inner", "outer" and the others describing the orientations or positional relations are used to depict positional relations of elements with reference to the drawings, which are only for convenience of describing the technical solution of the disclosure and simplifying the description, and not intended to indicate or imply that the apparatus or element referred to must have the specific orientation, or must be constructed and operated in the specific orientation, and therefore, those wordings should not be construed as limitations on the present disclosure. The positional relations of the constituent elements may be appropriately changed according to the direction of each of the constituent elements described. Therefore, the wordings described in the specification are not restrictive, and may be appropriately replaced according to the situation.

In the present disclosure, a transistor refers to an element including at least three terminals, namely, a gate electrode, a drain electrode and a source electrode. The transistor has a channel region between the drain electrode (drain electrode terminal, drain region, or drain electrode) and the source electrode (source electrode terminal, source region, or source electrode), and a current may flow through the drain electrode, the channel region, and the source electrode. In the present disclosure, the channel region refers to a region that the current mainly flows through.

In the present disclosure, a first electrode may be a drain electrode and a second electrode may be a source electrode, alternatively, the first electrode may be a source electrode and the second electrode may be a drain electrode. In a case of using transistors with opposite polarities or in a case where the direction of the current in circuit operation changes, functions of the "source electrode" and the "drain electrode" may be interchanged sometimes. Therefore, in the present disclosure, "the source electrode" and "the drain electrode" are interchangeable.

In the present disclosure, "parallel" refers to a state in which an angle formed by two straight lines is above −10 degrees and below 10 degrees, and thus may include a state in which the angle is above −5 degrees and below 5 degrees. In addition, "perpendicular" refers to a state in which an angle formed by two straight lines is above 80 degrees and below 100 degrees, and thus may include a state in which the angle is above 85 degrees and below 95 degrees.

In the present disclosure, "film" and "layer" are interchangeable. For example, "conductive layer" may be replaced with "conductive film" sometimes. Similarly, "insulating film" may be replaced with "insulating layer" sometimes.

In the present disclosure, "about" refers to a numerical value within a range of allowable process and measurement errors without strictly limiting the limit.

For keeping the following description of the embodiments of the disclosure clear and concise, detailed descriptions about part of known functions and known components are omitted in the disclosure. The drawings of the embodiments of the disclosure only involve the structures involved in the embodiments of the disclosure, and the other structures may refer to conventional designs.

FIG. 1 is a schematic diagram of a circuit structure of an OLED display apparatus. As shown in FIG. 1, the OLED display apparatus may include a scan signal driver, a data signal driver, a light-emitting signal driver, an OLED display substrate, a first power unit, a second power unit, and an initial power unit. In an exemplary embodiment, an OLED display substrate at least includes multiple scan signal lines (S1 to SN), multiple data signal lines (D1 to DM) and multiple light-emitting signal lines (EM1 to EMN); the scan signal driver is configured to sequentially supply scan signals to the multiple scan signal lines (S1 to SN), the data signal driver is configured to supply data signals to the multiple data signal lines (D1 to DM), and the light-emitting signal driver is configured to sequentially supply light-emitting control signals to the multiple light-emitting signal lines (EM1 to EMN). In an exemplary embodiment, the multiple scan signal lines and the multiple light-emitting signal lines extend in a horizontal direction, and the multiple data signal lines extend in a vertical direction. In an exemplary embodiment, the multiple scan signal lines and the data signal lines intersect to define multiple sub-pixels. At least one sub-pixel includes a pixel drive circuit and a light-emitting device. The pixel drive circuit is respectively connected to a scan signal line, a data signal line, and a light-emitting signal line. The pixel drive circuit is configured to receive a data voltage transmitted by the data signal line and output a corresponding current to the light-emitting device under control of the scan signal line and the light-emitting signal line. The light-emitting device is configured to emit light of corresponding brightness in response to the current output by the pixel drive circuit of the sub-pixel where the light-emitting device is located. A first power unit is configured to provide a first power voltage to the pixel drive circuit through a first power line, a second power unit is configured to provide a second power voltage to the pixel drive circuit through a second power line, and an initial power unit is configured to provide an initial power voltage to the pixel drive circuit through an initial signal line.

Figure 2A:
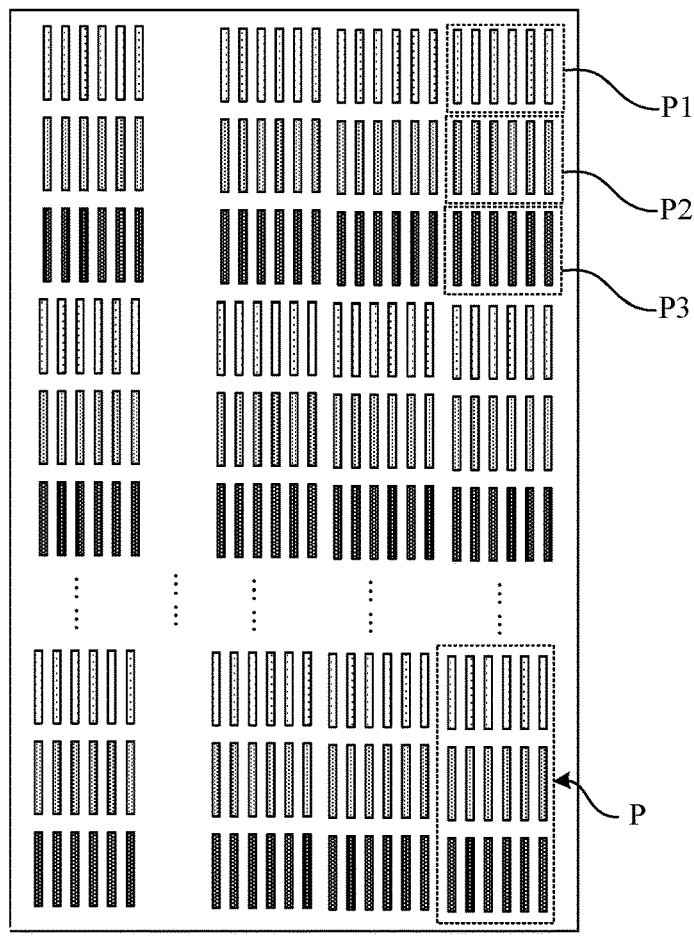
FIG. 2A is a schematic diagram of a planar structure of a display region of a display substrate.
Figure 2B:
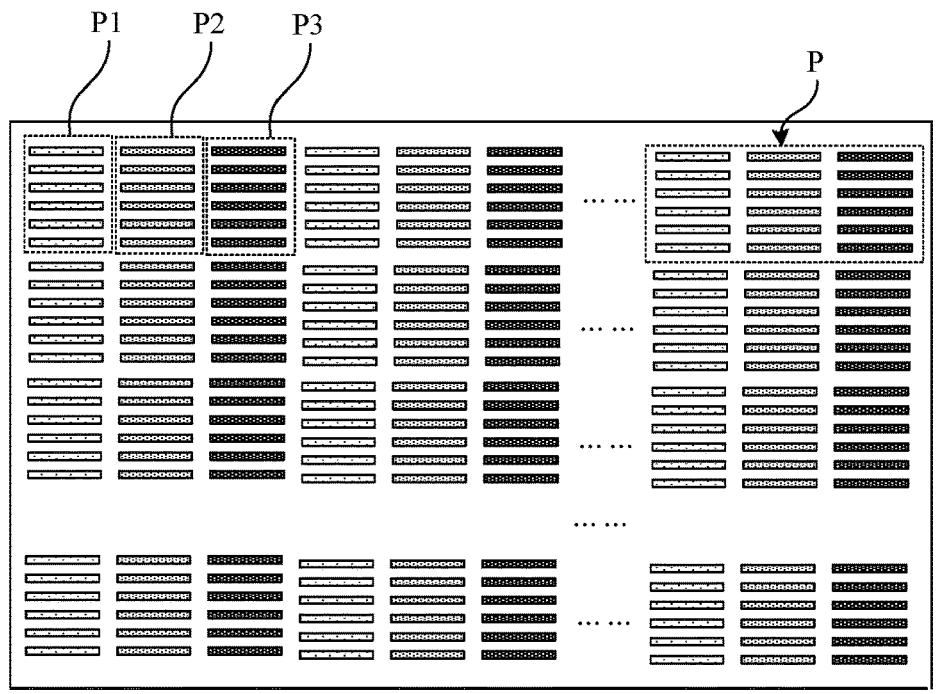
FIG. 2B is a schematic diagram of a planar structure of a display region of another display substrate.

FIG. 2 is a schematic diagram of a planar structure of a display region of a display substrate. As shown in FIG. 2, the display region may include multiple groups of pixel islands P arranged in a matrix, and any group of pixel islands P includes a first pixel island P1 emitting light of a first color, a second pixel island P2 emitting light of a second color, and a third pixel island P3 emitting light of a third color. The adjacent first pixel island P1, the second pixel island P2 and the third pixel island P3 form a repeat unit. Sub-pixels in a same pixel island display a same color. In the Figure, one pixel island including 6 sub-pixels is taken as an example, but the present disclosure is not limited to it. In an exemplary embodiment, a group of pixel islands P may include a red (R) pixel island, a green (G) pixel island, and a blue (B) pixel island, or may include a red pixel island, a green pixel island, a blue pixel island and a white (W) pixel island, which is not limited in the present disclosure. In an exemplary embodiment, a shape of a sub-pixel in a pixel island may be a rectangle. FIG. 2A is an example of arrangement of pixels. In FIG. 2A, in a horizontal direction, a row of pixel islands displays a same color, for example, a first row of pixel islands displays a first color, a second row of pixel islands displays a second color, and a third row of pixel islands displays a third color. FIG. 2B is another example of arrangement of pixels. In FIG. 2B, a column of pixel islands displays a same color, for example, a first column of pixel islands displays a first color, a second column of pixel islands displays a second color, and a third column of pixel islands displays a third color.

Figure 3:
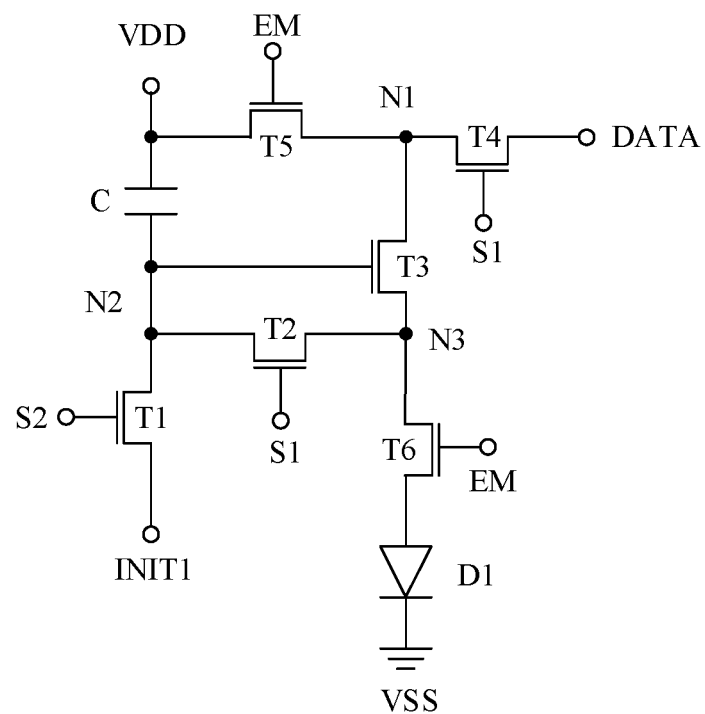
FIG. 3 is a schematic diagram of an equivalent circuit of a pixel drive circuit.

In an exemplary embodiment, the pixel drive circuit may have a structure of 3T1C, 4T1C, 5T1C, 5T2C, 6T1C, or 7T1C. FIG. 3 is an equivalent circuit diagram of a pixel drive circuit. As shown in FIG. 3, the pixel drive circuit has a 6T1C structure, which may include 6 switch transistors (a first transistor T1 to a sixth transistor T6), a storage capacitor C, and multiple signal lines (a data signal line, a first scan signal line S1, a second scan signal line S2, a first initial signal line INIT1, a first power line VSS, a second power line VDD, and a light-emitting signal line EM). The first initial signal line INIT1 and the second initial signal line INIT2 may be a same signal line.

In an exemplary embodiment, a control electrode of the first transistor T1 is connected to the second scan signal line S2, a first electrode of the first transistor T1 is connected to the first initial signal line INIT1, and a second electrode of the first transistor is connected to a second node N2. A control electrode of the second transistor T2 is connected to the first scan signal line S1, a first electrode of the second transistor T2 is connected to the second node N2, and a second electrode of the second transistor T2 is connected to a third node N3. A control electrode of the third transistor T3 is connected to the second node N2, a first electrode of the third transistor T3 is connected to a first node N1, and a second electrode of the third transistor T3 is connected to the third node N3. A control electrode of the fourth transistor T4 is connected to the first scan signal line S1, a first electrode of the fourth transistor T4 is connected to the data signal line, and a second electrode of the fourth transistor T4 is connected to the first node N1. A control electrode of the fifth transistor T5 is connected to the light-emitting signal line EM, a first electrode of the fifth transistor T5 is connected to the second power line VDD, and a second electrode of the fifth transistor T5 is connected to the first node N1. A control electrode of the sixth transistor T6 is connected to the light-emitting signal line EM, a first elec-trode of the sixth transistor T6 is connected to the third node N3, a second electrode of the sixth transistor T6 is connected to a first electrode of a first light-emitting device D1, and a second electrode of the first light-emitting device is connected to the first power line VSS. A first terminal of the storage capacitor C is connected to the second power line VDD, and a second terminal of the storage capacitor C is connected to the second node N2.

In an exemplary embodiment, the first transistor T1 to the nth transistor Tn may be P-type transistors or may be N-type transistors. Adopting transistors of a same type in a pixel drive circuit may simplify a process flow, reduce difficulty in a process of a display panel, and improve a product yield. In some possible implementations, the first transistor T1 to the nth transistor Tn may include P-type transistors and N-type transistors.

In an exemplary embodiment, a second electrode of the light-emitting device is connected to the first power line VSS. A signal on the first power line VSS is a low level signal, and a signal on the second power line VDD is a high level signal that is continuously supplied. The first scan signal line S1 is a scan signal line in a pixel drive circuit of a present display row, and the second scan signal line S2 is a scan signal line in a pixel drive circuit of a previous display row. That is, for an nth display row, the first scan signal line S1 is S(n), the second scan signal line S2 is S(n−1), the second scan signal line S2 of the present display row and the first scan signal line S1 in the pixel drive circuit of the previous display row are a same signal line, which may reduce signal lines of the display panel and realize a narrow bezel of the display panel.

A gate drive circuit (GOA) and a multiplexing circuit (MUX) may be provided in a bezel region of the display substrate. A gate drive circuit may include multiple cascaded shift register units, each of which is connected to at least one scan signal line of a display region and configured to provide a gate drive signal to at least one scan signal line of the display region. A multiplexing circuit may include multiple multiplexing units, each of which is connected to multiple data signal lines of the display region and configured to enable one signal source to provide data signals (DATA) for the multiple data signal lines When multi-view three-dimensional display is performed in the pixel arrangement as shown in FIG. 2A or FIG. 2B, each sub-pixel needs to be connected to a data signal line, so the number of data signal lines required is far more than that of conventional display. If the conventional multiplexing circuit is adopted, charging time will be shortened, display quality will be degraded, and in most extreme cases, data may not be written.

An embodiment of the present disclosure provides a display panel including a display region and a bezel region. The display region includes multiple scan signal lines, multiple data signal lines intersecting the scan signal lines, and multiple sub-pixels defined by the intersection of the scan signal lines and the data signal lines. When a scan signal is input to a scan signal line, a data signal line writes a data signal into a corresponding sub-pixel. The bezel region includes multiple multiplexing circuits, and at least one multiplexing circuit includes m multiplexing units, 2n multiplexing control signal lines, m first multiplexing data signal lines, at least one second multiplexing data signal line and n data signal output lines. Each data signal output line is connected to a data signal line, $2 \leq m \leq n$, and m and n are positive integers. Each multiplexing unit is connected to a first multiplexing data signal line, and the multiplexing unit is configured to receive a gating signal of the first multiplexing data signal line based on control signals of 2n multiplexing control signal lines in a first stage, and is configured to, in a second stage, based on the gating signal, write a first type data signal of the first multiplexing data signal line or a second type data signal of the second multiplexing data signal line into a data signal line through a data signal output line when a scan signal is input to a scan signal line.

By writing the gating signal in advance, each multiplexing unit can simultaneously write the data signal into the data signal line through the data signal output line when the scan signal is input to the scan signal line, thus ensuring that the charging time will not be reduced.

In an exemplary embodiment, each multiplexing unit may include multiple multiplexing sub-units, each of which is connected to two multiplexing control signal lines, a first multiplexing data signal line, a second multiplexing data signal line and a data signal output line, and the multiplexing sub-unit includes a first gating circuit and a second gating circuit.

The first gating circuit is configured to receive a first gating signal input from the first multiplexing data signal line based on control of a first multiplexing control signal line in a first stage, and in a second stage, based on the first gating signal, to write a first type data signal of the first multiplexing data signal line into the data signal line through the data signal output line when a scan signal is input to the scan signal line.

The second gating circuit is configured to receive a second gating signal input from the first multiplexing data signal line based on control of a second multiplexing control signal line in a first stage, and in a second stage, based on the second gating signal, to write a second type data signal of the second multiplexing data signal line into the data signal line through the data signal output line when a scan signal is input to the scan signal line.

In an exemplary embodiment, in the first stage, the gating signal of the first multiplexing data signal line is the first gating signal or the second gating signal.

In an exemplary embodiment, the first gating circuit includes a first multiplexing transistor, a second multiplexing transistor and a first multiplexing capacitor. A control electrode of the first multiplexing transistor is connected to the first multiplexing control signal line, a first electrode of the first multiplexing transistor is connected to the first multiplexing data signal line, and a second electrode of the first multiplexing transistor is connected to a first multiplexing node. A control electrode of the second multiplexing transistor is connected to the first multiplexing node, a first electrode of the second multiplexing transistor is connected to the first multiplexing data signal line, and a second electrode of the second multiplexing transistor is connected to the data signal output line. A first electrode of the first multiplexing capacitor is connected to the first multiplexing node, and a second electrode of the first multiplexing capacitor is connected to a first power line.

In an exemplary embodiment, the second gating circuit includes a third multiplexing transistor and a second multiplexing capacitor. A control electrode of the third multiplexing transistor is connected to the second multiplexing control signal line, a first electrode of the third multiplexing transistor is connected to the second multiplexing data signal line, and a second electrode of the third multiplexing transistor is connected to the data signal output line. The second gating circuit and the first gating circuit are connected to the same data signal output line. A first electrode of the second multiplexing capacitor is connected to the second multiplexing control signal line, and a second electrode of the second multiplexing capacitor is connected to the first power line.

In an exemplary embodiment, the first stage is a blanking stage after transmission of a first image frame and before the start of transmission of a second image frame, and the second stage is a stage of the transmission of the second image frame.

In an exemplary embodiment, a multiplexing circuit provides data signals for all sub-pixels in a pixel island, the number of multiplexing units contained in a multiplexing circuit is smaller than or equal to the number of sub-pixels contained in a pixel island, the number of multiplexing sub-units contained in a multiplexing unit is the same as the number of sub-pixels contained in the pixel island, and each multiplexing sub-unit is connected to two multiplexing control signal lines.

Figure 4:
FIG. 4 is a schematic diagram of a display feature of a 3D display data column.

When 3D data is displayed by a display panel adopting pixel island technology, only part of sub-pixels in a pixel island are turned on at the same time, for example, only 4 to 6 sub-pixels in 12 sub-pixels may be turned on, and there is no data for sub-pixels that are not turned on, that is, grayscales are 0. A display rule of pixel islands in a same column is the same, that is, conductive sub-pixels in each pixel island in a column are the same. If a column of sub-pixels is represented as a row, a schematic diagram is as shown in FIG. 4. Therefore, the number of multiplexing units in a multiplexing circuit and the number of corresponding connected first multiplexing data signal lines in fact depend on how many sub-pixels need to display data. Other sub-pixels that do not need to display data may be input with 0 grayscale signals (second type data signals) through the second multiplexing data signal line.

By multiplexing the first multiplexing data signal line, the gating signal is written in advance in the first stage, so that in the second stage, when a scan signal is input to the scan signal line, each multiplexing unit can simultaneously write a data signal into the data signal line through the data signal output line to ensure that the charging time will not be reduced. In addition, multiplexing the first multiplexing data signal line to write the gating signal does not need adding gating signal lines and extra wiring. In addition, when the second type data signal is a 0 grayscale signal, 0 grayscale combination may be realized, that is, input of the 0 grayscale signal may be realized by using a second multiplexing data signal line, thereby saving power consumption.

Figure 5:
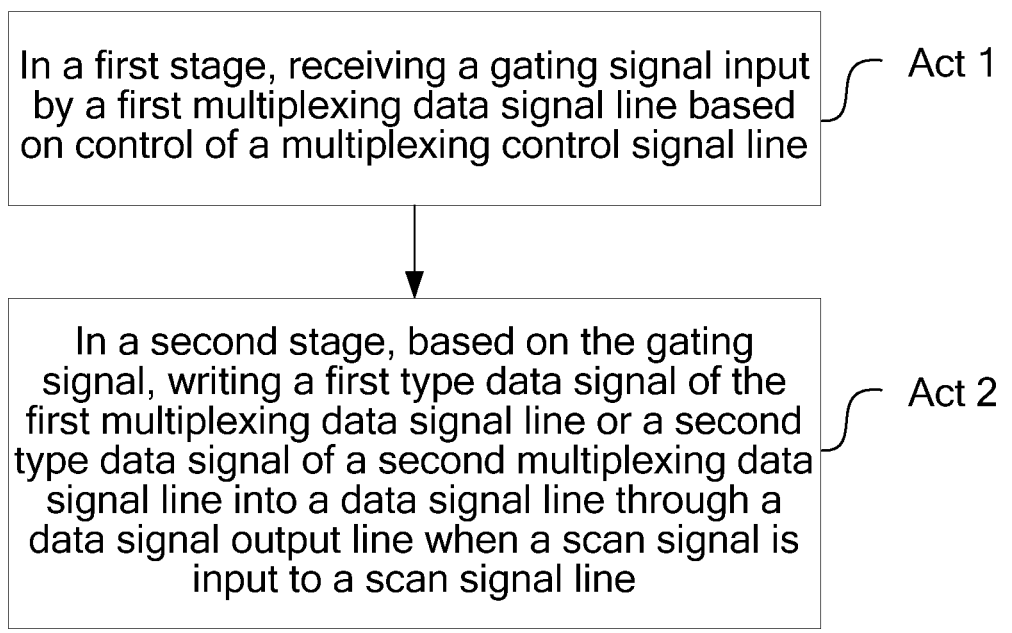
FIG. 5 is a flowchart of a driving method of a display panel according to an embodiment of the present disclosure.

An embodiment of the present disclosure further provides a driving method of a display panel which may be the aforementioned display panel. The driving method is as shown in FIG. 5, including:

Act 1, in a first stage, receiving a gating signal input by a first multiplexing data signal line based on control of a multiplexing control signal line;

Act 2, in a second stage, based on the gating signal, writing a first type data signal of the first multiplexing data signal line or a second type data signal of a second multiplexing data signal line into a data signal line through a data signal output line when a scan signal is input to a scan signal line.

By writing the gating signal in advance, each multiplexing unit can simultaneously write a data signal into the data signal line through the data signal output line when a scan signal is input to the scan signal line, that is, signals are rewritten into sub-pixels in a same row at the same time, thus ensuring that the charging time will not be reduced.

In an exemplary embodiment, the first stage is a blanking stage after transmission of a first image frame and before start of transmission of a second image frame, and the second stage is a stage of the transmission of the second image frame.

In an exemplary embodiment, the second type data signal is a 0 grayscale signal.

By multiplexing the first multiplexing data signal line, the gating signal is written in advance in the first stage, so that in the second stage, when a scan signal is input to the scan signal line, the first type data signal of the first multiplexing data signal line or the second type data signal of the second multiplexing data signal line may be written into the data signal line through the data signal output line, ensuring that the charging time will not be reduced. In addition, when the second type data signal is a 0 grayscale signal, 0 grayscale combination may be realized, that is, input of the 0 grayscale signal may be realized by using a second multiplexing data signal line, thereby saving power consumption.

The above technical solution will be described below through exemplary embodiments A multiplexing circuit may include multiple multiplexing units, each of which is connected to multiple data signal lines of the display region and configured to enable one signal source to provide data signals for multiple data signal lines.

In an exemplary embodiment, the multiplexing circuit may include multiple multiplexing control signal lines, multiple first multiplexing data signal lines, a second multiplexing data signal line, and multiple multiplexing units, and each multiplexing unit is connected to multiple data signal lines of the display region. The multiplexing unit is configured to provide a first type data signal of a first multiplexing data signal line (such as an image data signal) or a second type data signal of the second multiplexing data signal line (such as a 0 grayscale signal) to the multiple data signal lines which are connected to the multiplexing unit according to control of the multiple multiplexing control signal lines.

In an exemplary embodiment, the multiplexing circuit may include 2n multiplexing control signal lines, m first multiplexing data signal lines, at least one second multiplexing data signal line, n data signal output lines, and m multiplexing units. At least one multiplexing unit of the m multiplexing units includes 2n multiplexing sub-units, m and n are positive integers greater than or equal to 2, and m≤n. n may be the number of sub-pixels connected to a multiplexing circuit, for example, it may be a total number of sub-pixels in a pixel island. m represents the number of sub-pixels that need to be displayed, that is, need input of image data, among all sub-pixels connected to a multiplexing circuit.

Figure 6:
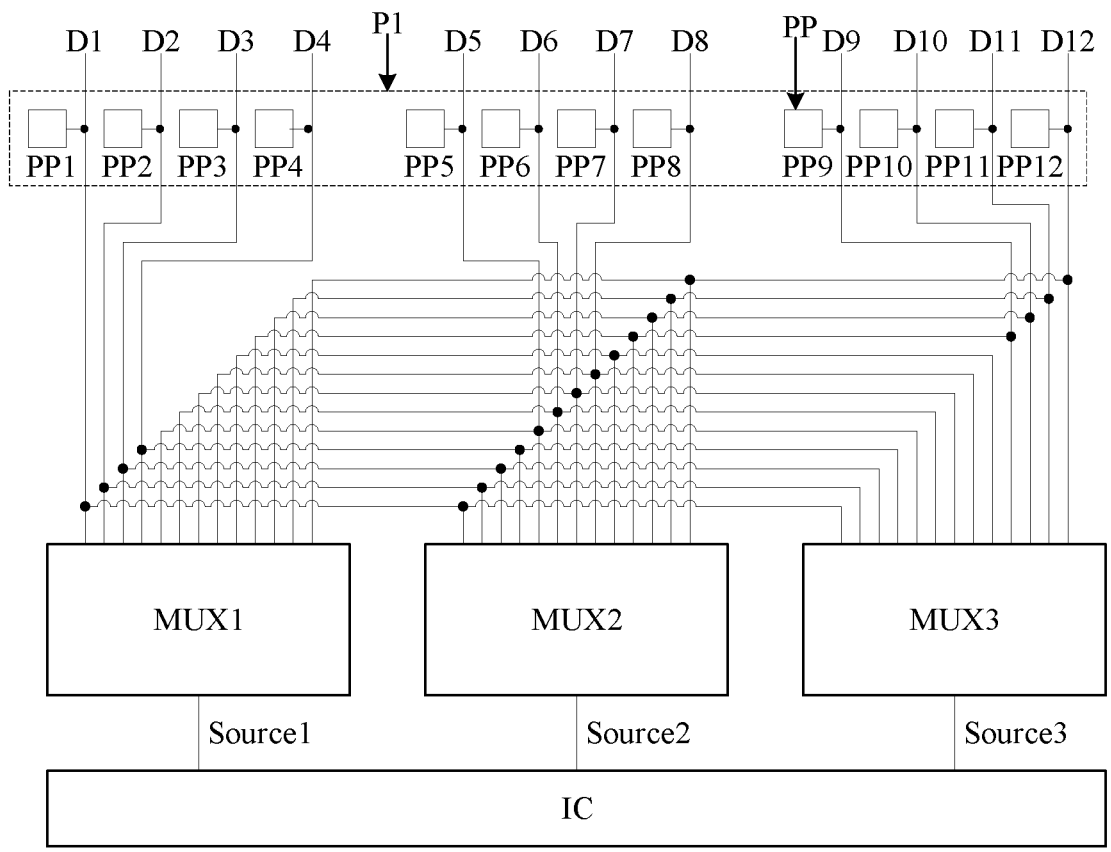
FIG. 6 is an equivalent circuit diagram of a multiplexing circuit according to an embodiment of the present disclosure.
Figure 7:
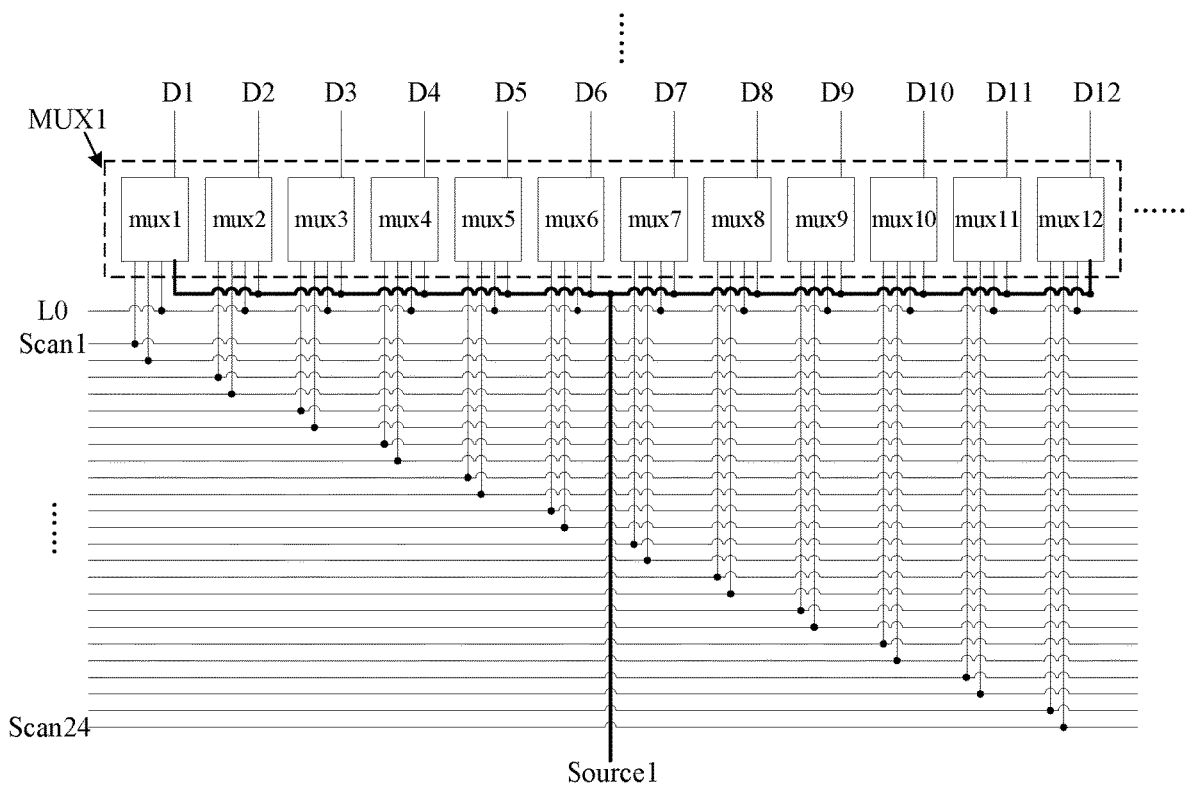
FIG. 7 is an equivalent circuit diagram of a multiplexing unit in FIG. 6.

Taking a pixel island including 12 sub-pixels PP with 3 sub-pixels having data as an example, each pixel island corresponds to 3 multiplexing units, and each multiplexing unit includes 12 multiplexing sub-units. FIG. 6 is an equivalent circuit diagram of a multiplexing circuit according to an embodiment of the present disclosure. FIG. 7 is an equivalent circuit diagram of a multiplexing unit in FIG. 6. In this embodiment, the multiplexing circuit includes a first multiplexing unit MUX1, a second multiplexing unit MUX2 and a third multiplexing unit MUX3. A control terminal of each multiplexing unit is connected to 24 multiplexing control signal lines (Scan1-Scan24), an input terminal of each multiplexing unit is connected to a first multiplexing data signal line and a second multiplexing data signal line L0, and an output terminal of each multiplexing unit is connected to 12 data signal output lines. 12 data signal output lines are connected to the data signal lines in the display region, and are configured to write data into the sub-pixels PP. Data signal output lines for a same sub-pixel output by multiple multiplexing units are connected to each other. Each multiplexing unit may multiplex the multiplexing control signal line.

Taking the first multiplexing unit MUX1 as an example, the first multiplexing unit MUX1 includes 12 multiplexing sub-units (mux1 to mux12), each multiplexing sub-unit (mux) includes two control terminals connected to different multiplexing control signal lines (Scan) respectively, two input terminals connected to the first multiplexing data signal line (Source in FIG. 7) and the second multiplexing data signal line L0 respectively, and an output terminal connected to data signal lines (D1 to D12) in the display region.

In other embodiments, if there are 4 sub-pixels having data, each pixel island corresponds to 4 multiplexing units, and each multiplexing unit is connected to a different first multiplexing data signal line. If there are 5 sub-pixels having data, each pixel island may correspond to 5 multiplexing units, and each multiplexing unit is connected to a different first multiplexing data signal line. If there are 6 sub-pixels having data, each pixel island may correspond to 6 multiplexing units, and each multiplexing unit is connected to a different first multiplexing data signal line, and so forth. At most n multiplexing units may be set, where n is the number of sub-pixels connected to a multiplexing circuit, for example, a total number of sub-pixels contained in a pixel island.

Figure 8:
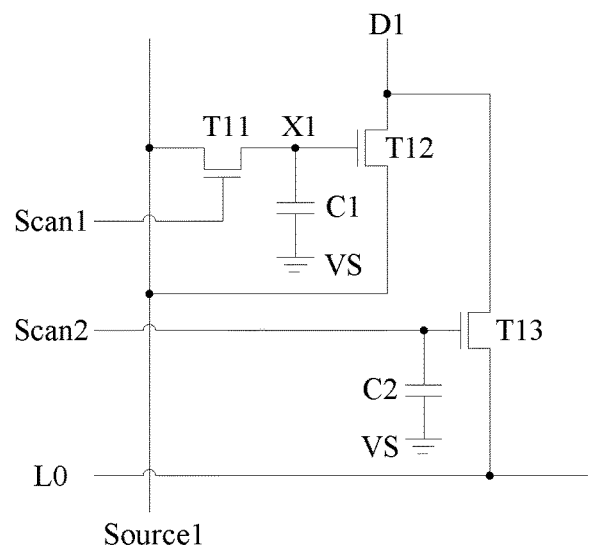
FIG. 8 is an equivalent circuit diagram of a multiplexing sub-unit in FIG. 7.

FIG. 8 is an equivalent circuit diagram of any multiplexing sub-unit in FIG. 7. A multiplexing sub-unit includes three multiplexing transistors and two multiplexing capacitors. As shown in FIG. 8, a control electrode of the first multiplexing transistor T11 is connected to a multiplexing control signal line (Scan1 in this example), a first electrode of the first multiplexing transistor T11 is connected to a first multiplexing data signal line (Source1 in this example), and a second electrode of the first multiplexing transistor T11 is connected to a first multiplexing node X1. A control electrode of the second multiplexing transistor T12 is connected to the first multiplexing node X1, a first electrode of the second multiplexing transistor T12 is connected to the first multiplexing data signal line (Source1 in this example), and a second electrode of the second multiplexing transistor T12 is connected to a data signal output line, and the data signal output line is connected to a data signal line (D1 in this example). A control electrode of the third multiplexing transistor T13 is connected to another multiplexing control signal line (Scan2 in this example), a first electrode of the third multiplexing transistor T13 is connected to a second multiplexing data signal line L0, and a second electrode of the third multiplexing transistor T13 is connected to a data signal output line, and the data signal output line is connected to a data signal line (D1 in this example). A first terminal of the first multiplexing capacitor C1 is connected to the first multiplexing node X1, and a second terminal of the first multiplexing capacitor C1 is connected to a first power line VS. A first terminal of the second multiplexing capacitor C1 is connected to a control electrode of the third multiplexing transistor T13, and a second terminal of the second capacitor C2 is connected to the first power line VS. The first multiplexing transistor T11, the second multiplexing transistor T12 and the first multiplexing capacitor constitute a first gating circuit, and the third multiplexing transistor T13 and the second multiplexing capacitor constitute a second gating circuit. In this example, the first gating circuit is configured to receive a first gating signal input by a first multiplexing data signal line (Source1) based on control of a first multiplexing control signal line (Scan1) in a first stage, and in a second stage, based on the first gating signal, to write a first type data signal of the first multiplexing data signal line (Source1) into the data signal line when a scan signal is input to the scan signal line. The second gating circuit is configured to receive a second gating signal input by the first multiplexing data signal line (Source1) based on control of a second multiplexing control signal line (Scan2) in a first stage, and in a second stage, based on the second gating signal, to write a second type data signal of the second multiplexing data signal line L0 into the data signal line when a scan signal is input to the scan signal line.

In an exemplary embodiment, the first multiplexing transistor T11 to the third multiplexing transistor T13 may be P-type transistors or may be N-type transistors. Adopting transistors of a same type in a pixel drive circuit may simplify a process flow, reduce difficulty in a process of a display panel, and improve a product yield.

Taking the first multiplexing transistor T11 to the third multiplexing transistor T13 being P-type transistors as an example, a working process of the multiplexing circuit will be described. During display, according to a viewer's eyeball position and an opening angle, lighting situations of the sub-pixels (that is, which sub-pixels need to display image data) in each column of pixel islands, that is, sub-pixels in each column of pixel islands that need to be lit, may be calculated through looking up a table. After transmission of each frame of image data is completed, the first multiplexing data signal line is multiplexed send a gating signal to the multiplexing circuit. In this example, taking the sub-pixels to be lit being a second sub-pixel, a third sub-pixel and a fourth sub-pixel in a column of pixel islands as an example, the gating signal transmitted by each first multiplexing data signal line is shown in Table 1. In Table 1, "1" means gated, "0" means not gated, and they do not represent high or low level.

TABLE 1

| Data | D1 | D2 | D3 | D4 | D5 | D6 | D7 | D8 | D9 | D10 | D11 | D12 |
|---|---|---|---|---|---|---|---|---|---|---|---|---|
| Time | 1 2 3 | 4 5 6 | 7 8 9 | 10 | 11 12 | 13 14 | 15 16 | 17 18 | 19 20 | 21 22 | 23 24 | |
| Source1 | 0 1 1 | 0 0 0 | 0 0 0 | 1 | 0 1 | 0 1 | 0 1 | 0 1 | 0 1 | 0 1 | 0 1 | |
| Source2 | 0 1 0 | 0 1 0 | 0 0 0 | 1 | 0 1 | 0 1 | 0 1 | 0 1 | 0 1 | 0 1 | 0 1 | |
| Source3 | 0 1 0 | 0 0 0 | 1 0 0 | 1 | 0 1 | 0 1 | 0 1 | 0 1 | 0 1 | 0 1 | 0 1 | |

For a first multiplexing data signal line, the gating signal transmitted by it includes a line gating signal for each data signal line, that is, the signal deciding whether the sub-pixel is lit or not, and each line gating signal includes a data gating signal (that is, a first gating signal) and a 0 grayscale gating signal (that is, a second gating signal). As for gating signals transmitted by Source1 in Table 1, for data signal lines D1, D5-D12, the data gating signal is 0, and the 0 grayscale gating signal is 1, indicating that there is no data transmission in the corresponding data signal line, and the corresponding sub-pixels in the pixel island do not need to be lit; for a second data signal line D2, the data gating signal is 1, and the 0 grayscale gating signal is 0, indicating that there is data transmission in D2 and a second sub-pixel in the pixel island needs to be lit; for data signal lines D3 and D4, the data gating signal is 0, and the 0 grayscale gating signal is 0, indicating that there is no line gating signal for these signal lines in the current gating signals, and it is needed to obtain gating signals from other first multiplexing data signal lines. As for gating signals transmitted by Source2 in Table 1, for data signal lines D1, D5-D12, the data gating signal is 0, and the 0 grayscale gating signal is 1, indicating that there is no data transmission in the corresponding data signal line, and the corresponding sub-pixels in the pixel island do not need to be lit; for a third data signal line D3, the data gating signal is 1, and the 0 grayscale gating signal is 0, indicating that there is data transmission in D3 and a third sub-pixel in the pixel island needs to be lit; for data signal lines D2 and D4, the data gating signal is 0, and the 0 grayscale gating signal is 0, indicating that there is no line gating signal for these signal lines, and it is needed to obtain gating signals from other first multiplexing data signal lines. As for gating signals transmitted by Source3 in Table 1, for data signal lines D1, D5-D12, the data gating signal is 0, and the 0 grayscale gating signal is 1, indicating that there is no data transmission in the corresponding data signal line, and the corresponding sub-pixels in the pixel island do not need to be lit; for a fourth data signal line D4, the data gating signal is 1, and the 0 grayscale gating signal is 0, indicating that there is data transmission in D4 and a fourth sub-pixel in the pixel island needs to be lit; for data signal lines D2 and D3, the data gating signal is 0, and the 0 grayscale gating signal is 0, indicating that there is no line gating signal for these signal lines, and it is needed to obtain gating signals from other first multiplexing data signal lines.

Figure 9:
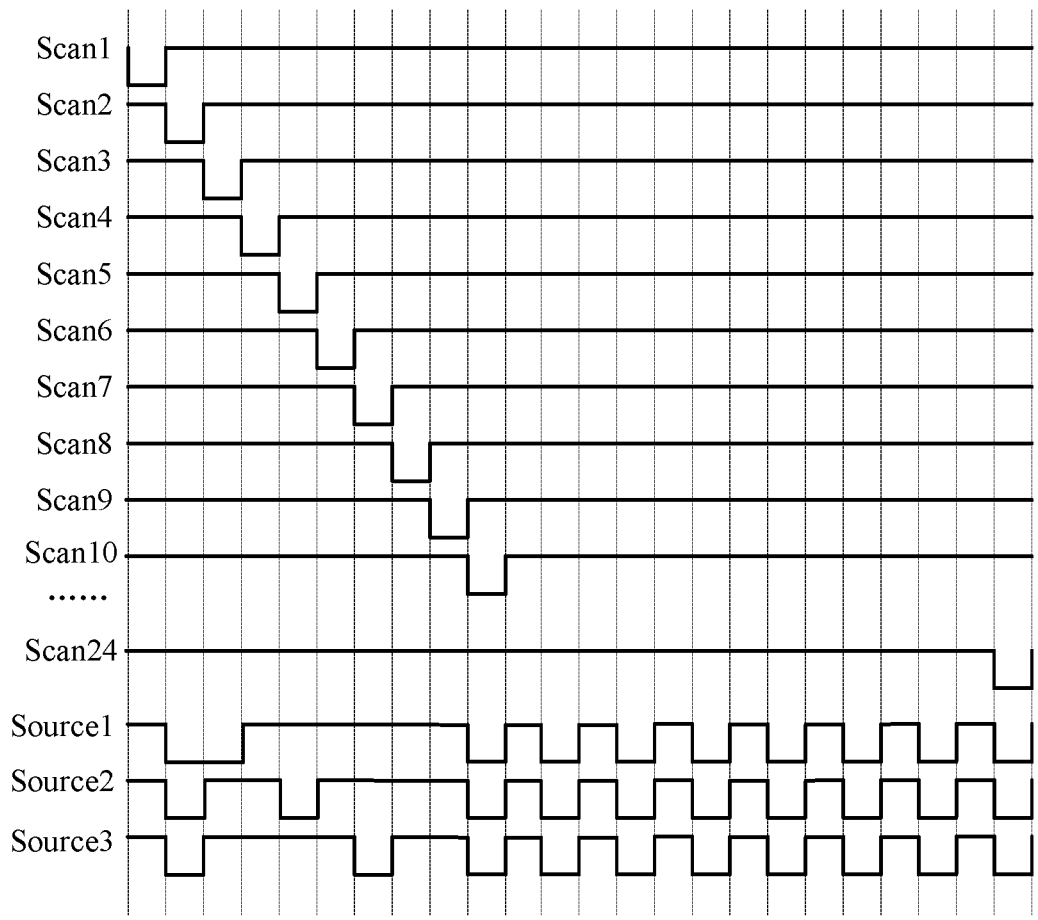
FIG. 9 is a timing diagram of signals of multiplexing control signal lines and signals of first multiplexing data signal lines.

In a blanking time at an end of each frame, the multiplexing control signal lines are scanned line by line or by time-sharing, and a gating signal is sent to each multiplexing unit through multiple first multiplexing data signal lines, which is used to inform the multiplexing unit which multiplexing sub-unit to turn on in a next frame. Timing of signals of multiplexing control signal lines and signals of first multiplexing data signal lines (Source1, Source2, and Source3) are shown in FIG. 9. When a low-level signal is input to a third multiplexing control signal line Scan3, a first multiplexing transistor T11 in a second multiplexing sub-unit is turned on, and a first multiplexing data signal line Source1 inputs a low-level gating signal to a control electrode of a second multiplexing transistor T12 in the second multiplexing sub-unit, so that a first multiplexing capacitor in the second multiplexing sub-unit is charged, and the first multiplexing capacitor in the second multiplexing sub-unit is configured to maintain the gating signal in a next frame time. When a low-level signal is input to a fifth multiplexing control signal line Scan5, a first multiplexing transistor T11 in a third multiplexing sub-unit is turned on, and the first multiplexing data signal line Source1 inputs a low-level gating signal to a control electrode of a second multiplexing transistor T12 in the third multiplexing sub-unit, so that the first multiplexing capacitor in the third multiplexing sub-unit is charged, and the first multiplexing capacitor in the third multiplexing sub-unit is configured to maintain the gating signal in a next frame time. When a low-level signal is input to a seventh multiplexing control signal line Scan7, a first multiplexing transistor T11 in a fourth multiplexing sub-unit is turned on, and the first multiplexing data signal line Source1 inputs a low-level gating signal to a control electrode of a second multiplexing transistor T12 in the fourth multiplexing sub-unit, so that the first multiplexing capacitor in the fourth multiplexing sub-unit is charged, and the first multiplexing capacitor in the fourth multiplexing sub-unit is configured to maintain the gating signal in a next frame time.

A low-level signal is input to the second multiplexing control signal line Scan2, so that the second multiplexing capacitor in the first multiplexing sub-unit is charged, and the second multiplexing capacitor in the first multiplexing sub-unit is configured to maintain a gating signal in a next frame time. Similarly, the second multiplexing capacitors in the fifth to twelfth multiplexing sub-units are charged one by one.

Figure 10:
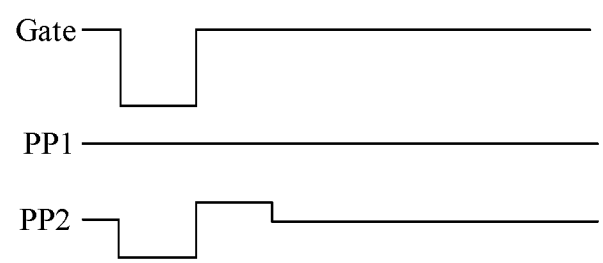
FIG. 10 is a timing diagram of a gate drive signal and data signals.

During the display of each data frame, taking the second multiplexing sub-unit as an example, the first multiplexing capacitor of the second multiplexing sub-unit keeps the second multiplexing transistor on, the first multiplexing data signal line Source1 inputs data to the data signal line, the gate drive circuit provides a gate drive signal Gate to the corresponding scan signal line in the display region, and the light-emitting signal driver provides a light-emitting control signal to the corresponding light-emitting signal line. Under control of the scan signal line and the light-emitting signal line, the pixel drive circuit receives a data voltage transmitted by the data signal line, and outputs a corresponding current to the light-emitting device. The light-emitting device in the second sub-pixel PP2 is connected to the pixel drive circuit in the sub-pixel, and the light-emitting device, in response to the current output by the pixel drive circuit of the sub-pixel, emits light of corresponding brightness. Timing of a gate drive signal and data signals is shown in FIG. 10. In a similar way, light-emitting devices in the third sub-pixel PP3 and the fourth sub-pixel PP4 emit light of corresponding brightness (not shown in FIG. 10).

For the first multiplexing sub-unit, the second multiplexing capacitor in the first multiplexing sub-unit keeps a third multiplexing transistor on, and a second multiplexing data signal line L0 inputs 0 grayscale data to the data signal line, that is, the first sub-pixel PP1 does not emit light. Similarly, none of the fifth sub-pixel PP5 to the twelfth sub-pixel PP12 emits light. When the gate drive circuit provides a gate drive signal Gate to a particular scan signal line in the display region, the data signal and the 0 grayscale signal gated by gating signals can be written into the pixel at the same time, thus ensuring that the charging time will not be reduced. In addition, the 0 grayscale signals are combined, that is, one L0 signal line is used for each row of sub-pixels, and thus power consumption can be reduced.

In this embodiment, since only three sub-pixels need to display data, the multiplexing circuit including three multiplexing units is taken as an example, and the number of multiplexing units may be designed as required, which is not limited in the present disclosure.

By providing the multiplexing circuit, one signal source (for example, a pin of the driver chip) may provide data signals for multiple data signal lines, which may reduce an actual quantity of signal sources and simplify a product structure.

An embodiment of the present disclosure further provides a display apparatus which includes a display substrate of any of the aforementioned embodiments. The display apparatus may be: any product or component with a display function, such as a mobile phone, a tablet, a television, a display, a laptop, a digital photo frame, or a navigator.

Although the embodiments disclosed in the present disclosure are as described above, the content described is only the embodiments used to facilitate the understanding of the present disclosure, and is not intended to limit the present disclosure. Those skilled in the art may make any modifications and variations to implementation forms and details without departing from the spirit and scope disclosed by the present disclosure. However, the patent protection scope of the present disclosure shall still be subject to the scope defined by the appended claims.

What we claim is:

1. A display panel, comprising: a display region and a bezel region, wherein, the display region comprises a plurality of scan signal lines, a plurality of data signal lines intersecting the scan signal lines, and a plurality of sub-pixels defined by the intersection of the scan signal lines and the data signal lines, wherein when a scan signal is input to a scan signal line, a data signal line writes a data signal into a corresponding sub-pixel;

the bezel region comprises a plurality of multiplexing circuits, and at least one multiplexing circuit comprises m multiplexing units, 2n multiplexing control signal lines, m first multiplexing data signal lines, at least one second multiplexing data signal line and n data signal output lines; wherein each data signal output line is connected to a data signal line, $2 \leq m \leq n$, and m and n are positive integers; each multiplexing unit is connected to a first multiplexing data signal line, and the multiplexing unit is configured to receive a gating signal of the first multiplexing data signal line based on control signals of the 2n multiplexing control signal lines in a first stage, and in a second stage, based on the gating signal, to write a first type data signal of the first multiplexing data signal line or a second type data signal of a second multiplexing data signal line into a data signal line through a data signal output line when a scan signal is input to a scan signal line.

2. The display panel of claim 1, wherein, each multiplexing unit comprises a plurality of multiplexing sub-units, each multiplexing sub-unit is connected to two multiplexing control signal lines, a first multiplexing data signal line, a second multiplexing data signal line and a data signal output line, and the multiplexing sub-unit comprises a first gating circuit and a second gating circuit, wherein, the first gating circuit is configured to receive a first gating signal input by the first multiplexing data signal line based on control of a first multiplexing control signal line in a first stage, and in a second stage, based on the first gating signal, to write a first type data signal of the first multiplexing data signal line into a data signal line through the data signal output line English Translation when a scan signal is input to a scan signal line;

the second gating circuit is configured to receive a second gating signal input by the first multiplexing data signal line based on control of a second multiplexing control signal line in a first stage, and in a second stage, based on the second gating signal, to write a second type data signal of the second multiplexing data signal line into the data signal line through the data signal output line when a scan signal is input to the scan signal line.

3. The display panel of claim 2, wherein the first gating circuit comprises a first multiplexing transistor, a second multiplexing transistor and a first multiplexing capacitor, wherein a control electrode of the first multiplexing transistor is connected to the first multiplexing control signal line, a first electrode of the first multiplexing transistor is connected to the first multiplexing data signal line, and a second electrode of the first multiplexing transistor is connected to a first multiplexing node; a control electrode of the second multiplexing transistor is connected to the first multiplexing node, a first electrode of the second multiplexing transistor is connected to the first multiplexing data signal line, and a second electrode of the second multiplexing transistor is connected to the data signal output line; a first electrode of the first multiplexing capacitor is connected to the first multiplexing node, and a second electrode of the first multiplexing capacitor is connected to a first power line.

4. The display panel of claim 2, wherein the second gating circuit comprises a third multiplexing transistor and a second multiplexing capacitor, wherein a control electrode of the third multiplexing transistor is connected to the second multiplexing control signal line, a first electrode of the third multiplexing transistor is connected to the second multiplexing data signal line, and a second electrode of the third multiplexing transistor is connected to the data signal output line; the second gating circuit and the first gating circuit are connected to the same data signal output line; a first electrode of the second multiplexing capacitor is connected to the second multiplexing control signal line, and a second electrode of the second multiplexing capacitor is connected to a first power line.

5. The display panel of claim 2, wherein the first stage is a blanking stage after transmission of a first image frame and before start of transmission of a second image frame, and the second stage is a stage of the transmission of the second image frame.

6. The display panel of claim 2, wherein a multiplexing circuit is configured to provide data signals for all sub-pixels in a pixel island, wherein the number of multiplexing units contained in a multiplexing circuit is smaller than or equal to the number of sub-pixels contained in a pixel island, the number of multiplexing sub-units contained in a multiplexing unit is equal to the number of sub-pixels contained in the pixel island, and each multiplexing sub-unit is connected to two multiplexing control signal lines.

7. The display panel of claim 1, wherein the second type data signal is a 0 grayscale signal.

8. A driving method, applied to the display panel of claim 1, the driving method comprising:

in a first stage, receiving a gating signal input by a first multiplexing data signal line based on control of a multiplexing control signal line; and in a second stage, based on the gating signal, writing a first type data signal of the first multiplexing data signal line or a second type data signal of a second multiplexing data signal line into a data signal line through a data signal output line when a scan signal is input to a scan signal line.

9. The driving method of claim 8, wherein the first stage is a blanking stage after transmission of a first image frame and before start of transmission of a second image frame, and the second stage is a stage of the transmission of the second image frame.

10. The driving method of claim 8, wherein the second type data signal is a 0 grayscale signal.

11. A display apparatus comprising a display panel, the display panel comprising: a display region and a bezel region, wherein, the display region comprises a plurality of scan signal lines, a plurality of data signal lines intersecting the scan signal lines, and a plurality of sub-pixels defined by the intersection of the scan signal lines and the data signal lines, wherein when a scan signal is input to a scan signal line, a data signal line writes a data signal into a corresponding sub-pixel;

the bezel region comprises a plurality of multiplexing circuits, and at least one multiplexing circuit comprises m multiplexing units, 2n multiplexing control signal lines, m first multiplexing data signal lines, at least one second multiplexing data signal line and n data signal output lines; wherein each data signal output line is connected to a data signal line, $2 \leq m \leq n$, and m and n are positive integers; each multiplexing unit is connected to a first multiplexing data signal line, and the multiplexing unit is configured to receive a gating signal of the first multiplexing data signal line based on control signals of the 2n multiplexing control signal lines in a first stage, and in a second stage, based on the gating signal, to write a first type data signal of the first multiplexing data signal line or a second type data signal of a second multiplexing data signal line into a data signal line through a data signal output line when a scan signal is input to a scan signal line.

12. The display apparatus of claim 11, wherein, each multiplexing unit comprises a plurality of multiplexing sub-units, each multiplexing sub-unit is connected to two multiplexing control signal lines, a first multiplexing data signal line, a second multiplexing data signal line and a data signal output line, and the multiplexing sub-unit comprises a first gating circuit and a second gating circuit, wherein, the first gating circuit is configured to receive a first gating signal input by the first multiplexing data signal line based on control of a first multiplexing control signal line in a first stage, and in a second stage, based on the first gating signal, to write a first type data signal of the first multiplexing data signal line into a data signal line through the data signal output line when a scan signal is input to a scan signal line;

the second gating circuit is configured to receive a second gating signal input by the first multiplexing data signal line based on control of a second multiplexing control signal line in a first stage, and in a second stage, based on the second gating signal, to write a second type data signal of the second multiplexing data signal line into the data signal line through the data signal output line when a scan signal is input to the scan signal line.

13. The display apparatus of claim 12, wherein the first gating circuit comprises a first multiplexing transistor, a second multiplexing transistor and a first multiplexing capacitor, wherein a control electrode of the first multiplexing transistor is connected to the first multiplexing control signal line, a first electrode of the first multiplexing transistor is connected to the first multiplexing data signal line, and a second electrode of the first multiplexing transistor is connected to a first multiplexing node; a control electrode of the second multiplexing transistor is connected to the first multiplexing node, a first electrode of the second multiplexing transistor is connected to the first multiplexing data signal line, and a second electrode of the second multiplexing transistor is connected to the data signal output line; a first electrode of the first multiplexing capacitor is connected to the first multiplexing node, and a second electrode of the first multiplexing capacitor is connected to a first power line.

14. The display apparatus of claim 12, wherein the second gating circuit comprises a third multiplexing transistor and a second multiplexing capacitor, wherein a control electrode of the third multiplexing transistor is connected to the second multiplexing control signal line, a first electrode of the third multiplexing transistor is connected to the second multiplexing data signal line, and a second electrode of the third multiplexing transistor is connected to the data signal output line; the second gating circuit and the first gating circuit are connected to the same data signal output line; a first electrode of the second multiplexing capacitor is connected to the second multiplexing control signal line, and a second electrode of the second multiplexing capacitor is connected to a first power line.

15. The display apparatus of claim 12, wherein the first stage is a blanking stage after transmission of a first image frame and before start of transmission of a second image frame, and the second stage is a stage of the transmission of the second image frame.

16. The display apparatus of claim 12, wherein a multiplexing circuit is configured to provide data signals for all sub-pixels in a pixel island, wherein the number of multiplexing units contained in a multiplexing circuit is smaller than or equal to the number of sub-pixels contained in a pixel island, the number of multiplexing sub-units contained in a multiplexing unit is equal to the number of sub-pixels contained in the pixel island, and each multiplexing sub-unit is connected to two multiplexing control signal lines.

17. The display apparatus of claim 11, wherein the second type data signal is a 0 grayscale signal.

* * * * *